(12) United States Patent
Dupont et al.

(10) Patent No.: US 11,325,488 B2
(45) Date of Patent: May 10, 2022

(54) HOUSING FOR A CHARGING DEVICE FOR A VEHICLE

(71) Applicant: Tyco Electronics France SAS, Pontoise (FR)

(72) Inventors: Bruno Dupont, Pontoise (FR); Tehuai Chin, Pontoise (FR)

(73) Assignee: Tyco Electronics France SAS, Pontoise (FR)

( * ) Notice: Subject to any disclaimer, the term of this patent is extended or adjusted under 35 U.S.C. 154(b) by 0 days.

(21) Appl. No.: 17/027,086

(22) Filed: Sep. 21, 2020

(65) Prior Publication Data

US 2021/0086632 A1    Mar. 25, 2021

(30) Foreign Application Priority Data

Sep. 20, 2019  (FR) ..................................... 1910377

(51) Int. Cl.
*B60L 53/16*        (2019.01)
(52) U.S. Cl.
CPC .................................... *B60L 53/16* (2019.02)
(58) Field of Classification Search
CPC ....................................................... B60L 53/16
USPC ......................................................... 320/109
See application file for complete search history.

(56) References Cited

U.S. PATENT DOCUMENTS

| | | | | |
|---|---|---|---|---|
| 2013/0175083 A1* | 7/2013 | Bonwit | ................. | H05K 5/0247 174/520 |
| 2013/0175989 A1* | 7/2013 | Bonwit | .................. | B60L 53/16 320/109 |
| 2015/0343914 A1 | 12/2015 | Osawa | | |
| 2017/0054248 A1 | 2/2017 | Moseke | | |
| 2018/0076438 A1* | 3/2018 | DeKeuster | ............. | B29C 70/88 |

FOREIGN PATENT DOCUMENTS

| | | |
|---|---|---|
| EP | 2904667 B1 | 6/2016 |
| EP | 3050172 B1 | 1/2018 |
| EP | 2573880 B1 | 2/2019 |
| WO | 2011104609 A1 | 9/2011 |
| WO | 2015004053 A1 | 1/2015 |

OTHER PUBLICATIONS

Extended European search report dated Jan. 15, 2021 in Appln. No. 20195994.7-1201, 7 pp.
Preliminary Search Report and Written Opinion, dated Jun. 15, 2020, 8 pages.

* cited by examiner

*Primary Examiner* — Suresh Memula
(74) *Attorney, Agent, or Firm* — Barley Snyder

(57) ABSTRACT

A housing for an electrical connector includes a first set of orifices receiving a plurality of first pins, a second set of orifices receiving a plurality of second pins, a first draining device evacuating a fluid from the first set of orifices, and a second draining device evacuating a fluid from the second set of orifices. The second pins having a voltage higher than the first pins. The first set of orifices and the second set of orifices extend through the housing from a first interface of the housing toward a second interface of the housing in a connecting direction. The first draining device and the second draining device are isolated from each other and prevent fluid communication between the fluid from the first set of orifices and the fluid from the second set of orifices.

18 Claims, 5 Drawing Sheets

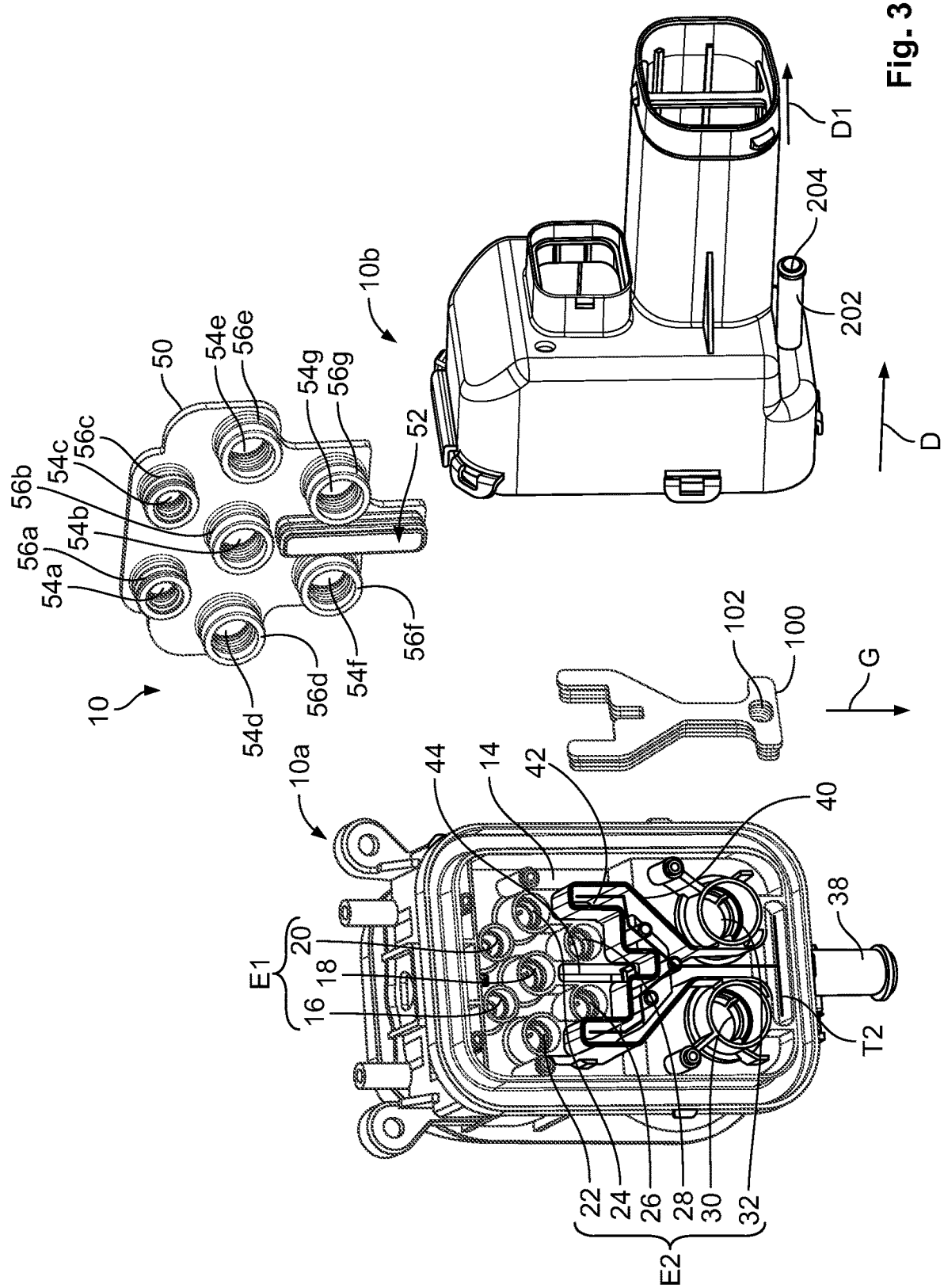

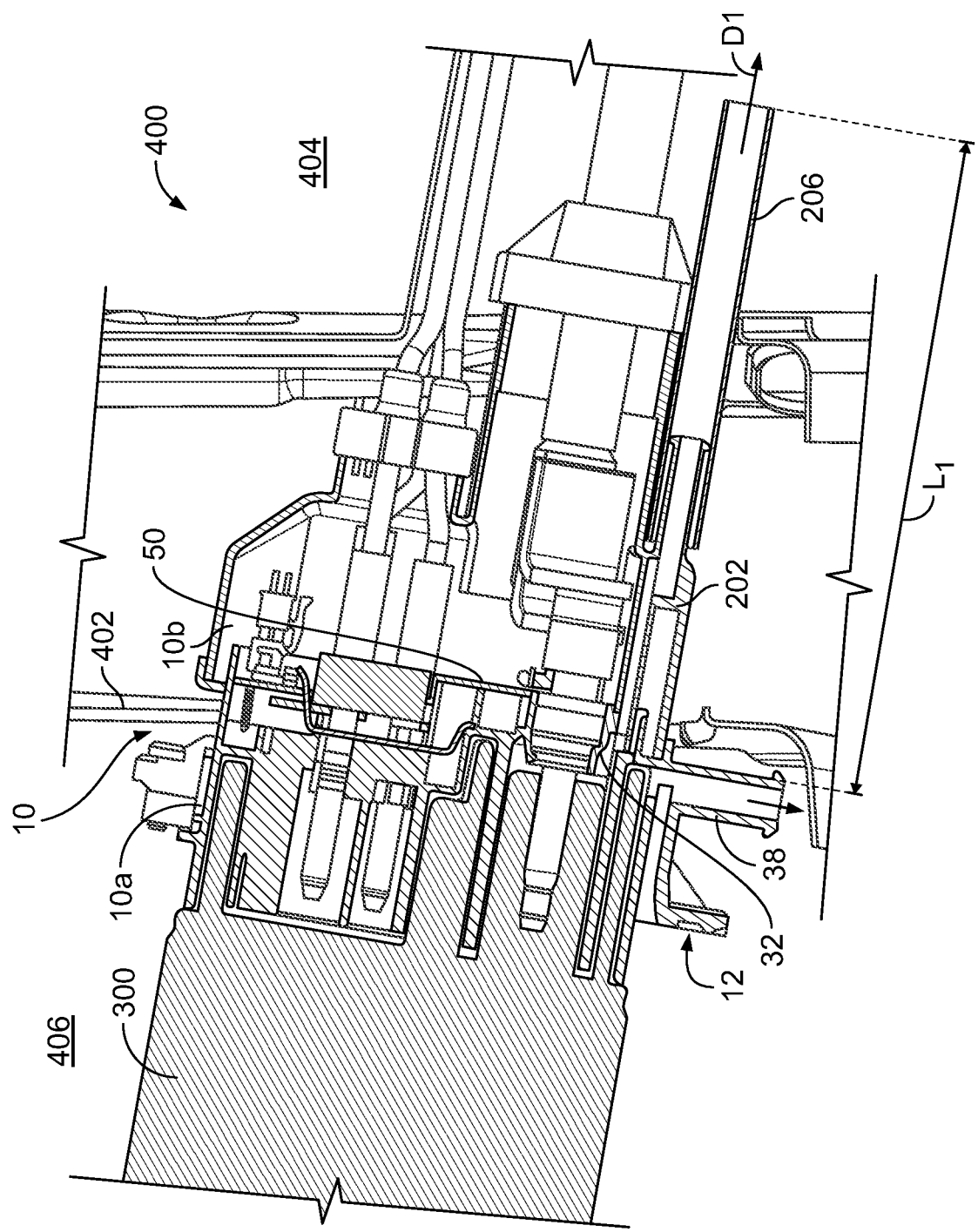

HOUSING FOR A CHARGING DEVICE FOR A VEHICLE

CROSS-REFERENCE TO RELATED APPLICATION

This application claims the benefit of the filing date under 35 U.S.C. § 119(a)-(d) of French Patent Application No. 1910377, filed on Sep. 20, 2019.

FIELD OF THE INVENTION

The present invention relates to a housing for a charging device and, more particularly, to a housing for a charging device for an electric vehicle.

BACKGROUND

The propulsion of electric vehicles is exclusively or partially provided by one or more electric motors. It can draw its energy from electrical storage devices such as a rechargeable battery. An example of an electric vehicle of this type is illustrated in FIG. 1. The vehicle 1 of FIG. 1 comprises an electric inlet 3 which the batteries of the vehicle 2 can be charged by a charging cable 5. The charging cable 5 has a charging nozzle 9 at one end 7, provided with a handle 11, and a portion 13 for connecting to the electric inlet 3 in a connecting direction E. Another end 15 of the charging cable 5, opposite to the end 7, is connected to a charging station 17.

The many standards which exist for charging connectors are a function of the geographical region in which the vehicle is being marketed. As an example, it is known to use a charging connector of the combined charging system (CCS) type in order to be able to charge an electric vehicle rapidly using direct current (DC). This type of charging connector can comprise both pins for direct current (DC) and pins for single phase or three phase alternating current (AC). A direct current (DC) supply means that the batteries can be charged relatively rapidly, and thus advantageously, because of its power output of at least 150 kW and a voltage of more than 400 V.

In order to accommodate charging an electric vehicle in rainy conditions, known charging connectors of this type are provided with drains which act as drainage holes at the level of cavities in which the pins are housed in order to evacuate water from the charging connector. However, it has been shown that in the case of heavy rain, the water evacuated via the drains can create a conducting pathway for electricity and thus generate a leakage current from the high voltage direct current or alternating current terminals. With the currently known design of charging connectors, it has been shown that the shortest pathway for moisture can direct the leakage current towards the charging nozzle. Thus, there is a risk of a closed circuit being created when a user manipulates the handle of the charging nozzle, for example. The risk to the user increases with the electrical power at the high voltage direct current terminals where the voltage is above 400 V.

SUMMARY

A housing for an electrical connector includes a first set of orifices receiving a plurality of first pins, a second set of orifices receiving a plurality of second pins, a first draining device evacuating a fluid from the first set of orifices, and a second draining device evacuating a fluid from the second set of orifices. The second pins having a voltage higher than the first pins. The first set of orifices and the second set of orifices extend through the housing from a first interface of the housing toward a second interface of the housing in a connecting direction. The first draining device and the second draining device are isolated from each other and prevent fluid communication between the fluid from the first set of orifices and the fluid from the second set of orifices.

BRIEF DESCRIPTION OF THE DRAWINGS

The invention will now be described by way of example with reference to the accompanying Figures, of which:

FIG. 3 is an exploded perspective view of the housing with a seal and a sealing plug;

FIG. 5 is a sectional side view of a connection between the housing and a charging nozzle.

DETAILED DESCRIPTION OF THE EMBODIMENT(S)

The invention will now be described in more detail with the aid of embodiments by way of example and with reference to the figures. The embodiments described are simply possible configurations and it should be borne in mind that the individual features as described herein may be provided independently of each other or may be omitted completely when carrying out the present invention.

Figure 2A:
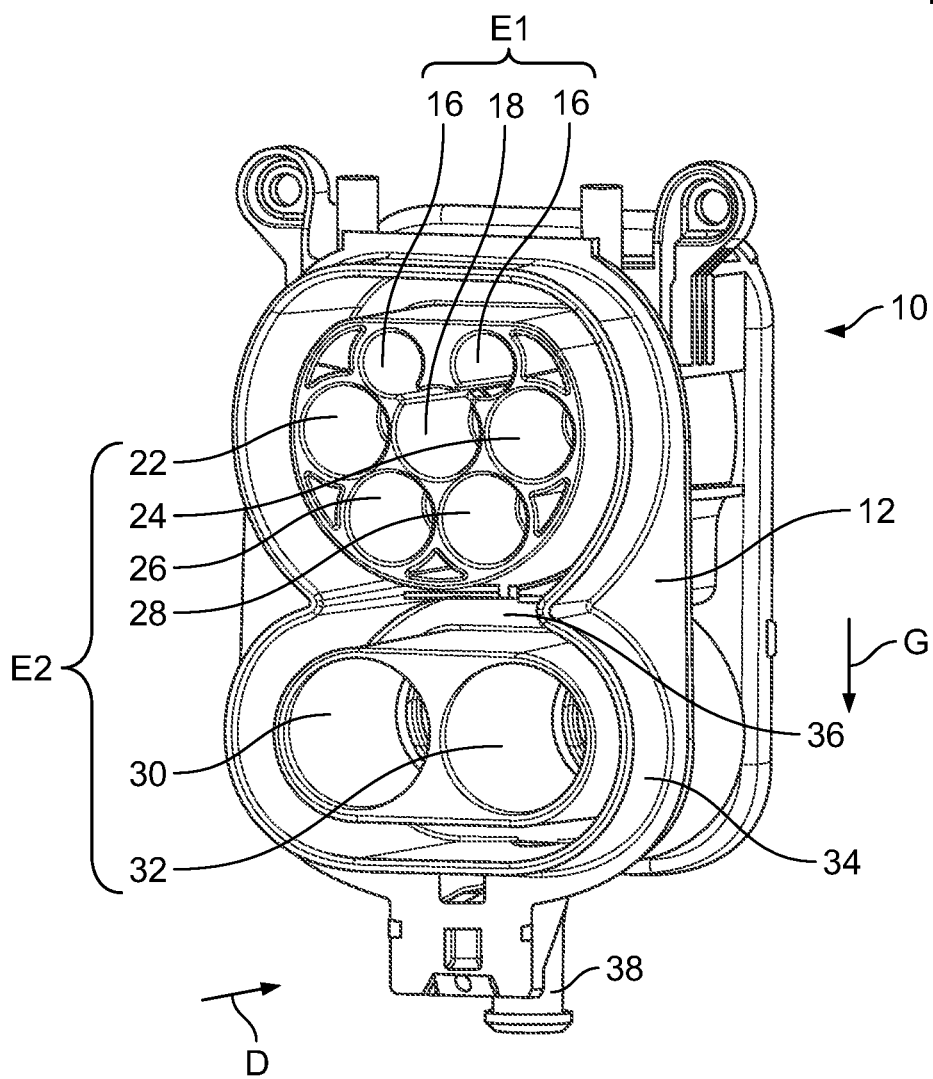
FIG. 2A is a perspective view of a first interface of a housing according to an embodiment.
Figure 2B:
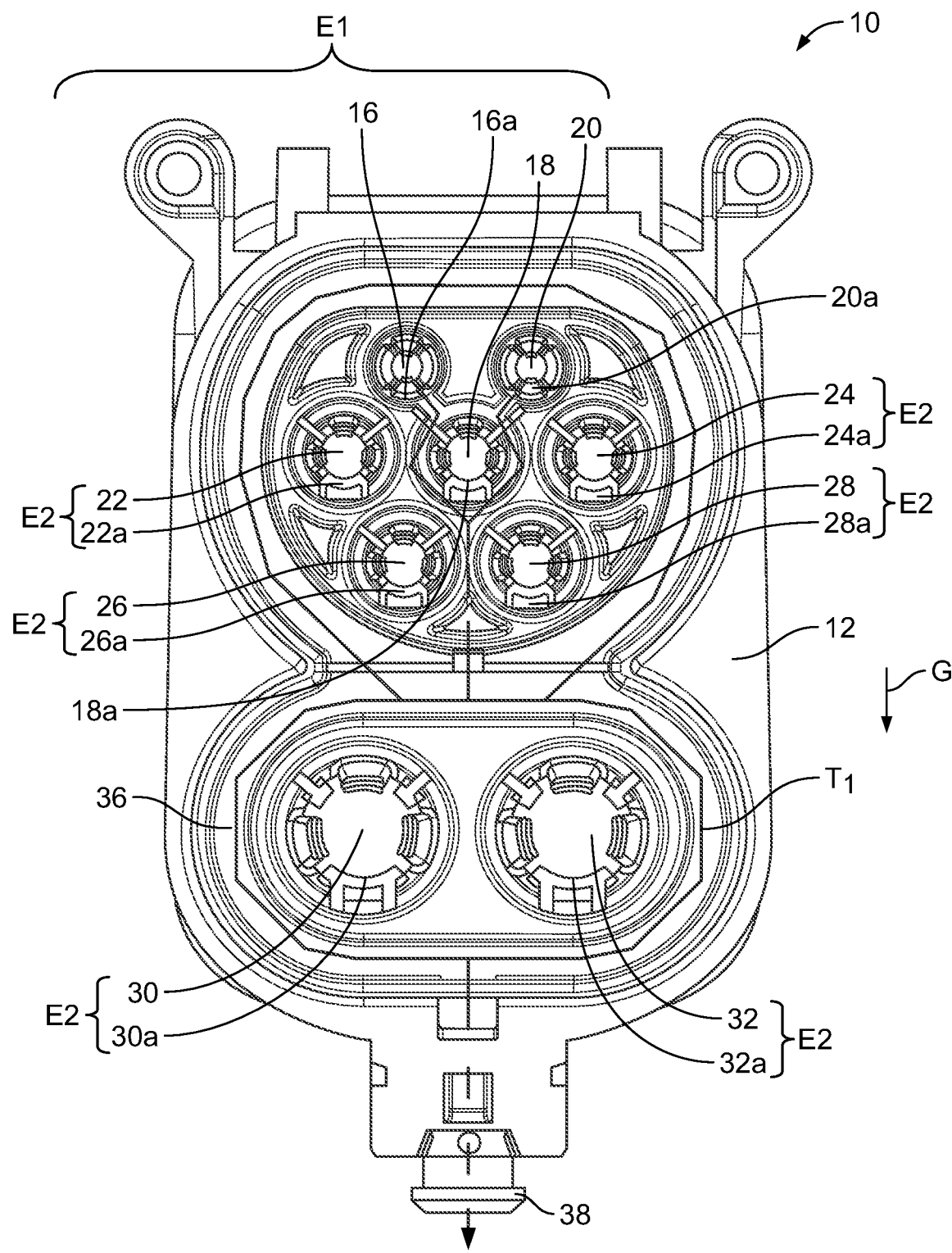
FIG. 2B is a front view of the first interface of the housing.

A housing 10 for an electrical connector, such as an electrical connector of a charging device for an electric vehicle, is shown in FIGS. 2A and 2B. The housing 10 is formed by an electrically insulating material. The housing 10, in an embodiment, may be manufactured from an injection molded plastic.

Figure 1:
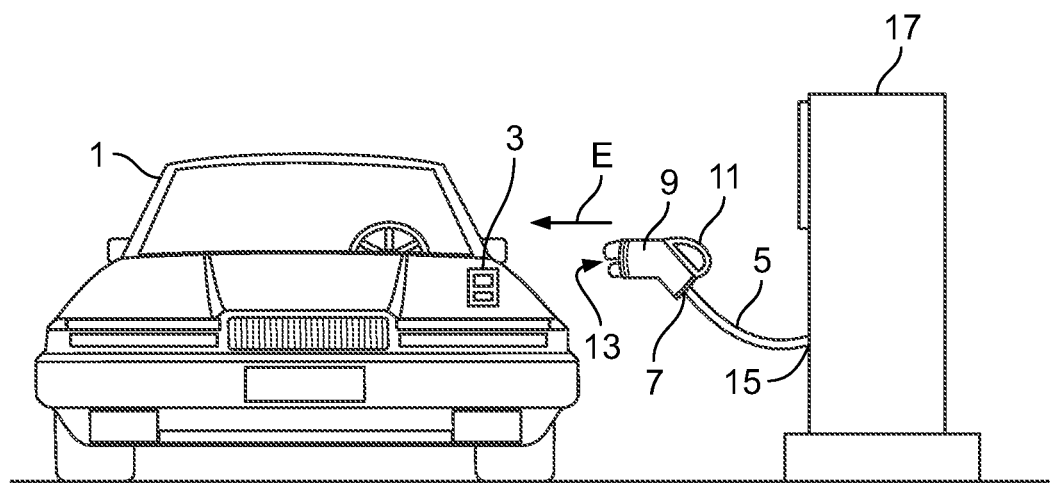
FIG. 1 is a schematic diagram of an electric vehicle and a charging station according to the prior art.

The housing 10 has a first interface 12 which is designed to be coupled with a housing of a mating electrical connector in a connecting direction indicated by the arrow D in FIG. 2A. The first interface 12 is in particular adapted to receive a mating electrical connector of a charging nozzle for an electric vehicle, such as that shown in FIG. 1 and indicated by reference numeral 9.

The housing 10 has a second interface 14, opposite to and parallel to the first interface 12, that is shown in FIG. 3. The housing 10 has a first set E1 of orifices 16, 18, 20 (references indicated by the abbreviation 16-20 below) and a second set E2 of orifices 22, 24, 26, 28, 30, 32 (references indicated by the abbreviation 22-32 below), as shown in FIGS. 2A, 2B, and 3. The orifices 16-32 are through holes which pass through the housing 10 from one side to the other, so that they open on the one hand at the level of the first interface 12 and on the other hand at the level of the second interface 14.

The orifices 16, 18, 20 of the first set E1 and the orifices 22, 24, 26, 28, 30, 32 of the second set E2 are provided with drains 16a, 18a, 20a, 22a, 24a, 26a, 28a, 30a, 32a in order to evacuate water, as shown in FIG. 2B. The drains 16a, 18a, 20a, 22a, 24a, 26a, 28a, 30a, 32a are a set of holes, cavities or tubes which can be used to collect a fluid which could stagnate in cavities orientated towards the top of the housing 10 in the gravitational direction.

The orifices 16, 18, 20 of the first set E1 are provided in order to receive low voltage pins (i.e. electrical contacts), for example 12 V; while the orifices 22-32 of the second set of orifices E2 are provided in order to receive pins at a higher voltage than that of the first set E1. The orifices 30, 32 of the second set of orifices E2 are in particular provided in order to receive a high voltage direct current power supply, in particular with a voltage of more than 400 V. The housing 10 is, for example, adapted for a connector of the Combo type.

The first interface 12 of the housing 10, as shown in FIG. 2A, has a wall 34 that extends perpendicular to the interface 12 in a manner such as to form a draining chamber 36 between the wall 34 and the sets of orifices E1, E2.

Only the drains 16a, 18a, 20a, 22a, 24a, 26a, 28a, 30a, 32a from the orifices 16, 18, 20 of the first set E1 are adapted to evacuate a fluid coming from said orifices 16, 18, 20 towards the draining chamber 36. This fluid can then be evacuated via an evacuation duct 38, shown in FIGS. 2A, 2B, and 3, located at the lowermost point of the housing 10 in the gravitational direction G. The draining chamber 36 corresponds to a counterpart of a charging nozzle.

The housing 10 comprises a first draining device which is suitable for evacuating a fluid, such as water coming from the first set of orifices E1, towards the draining chamber 36 of the first interface 12 of the housing 10. A flow path for a fluid coming from the first set of orifices E1 is represented by the outline T1 in FIG. 2B. The draining chamber 36 is constituted by a seal disposed on the second interface 14 of the housing 10, opposite to and parallel to the first interface 12, which is shown in FIG. 3 and described below. The first draining device in accordance with the present invention therefore comprises the draining chamber 36 constituted by the seal, in particular a seal produced from rubber.

In accordance with the present invention, the housing 10 comprises a second draining device which is suitable for evacuating a fluid coming from the second set of orifices E2 in a manner that is separated from the first set of orifices E1. The second draining device will be described below primarily with reference to FIGS. 3, 4A and 5. FIG. 3 illustrates the second interface 14 of the housing 10 provided with the first set of orifices E1 and the second set of orifices E2 described above with reference to FIGS. 2A and 2B. The reference elements carrying the same reference numerals mentioned above will not be described again and reference should be made to FIGS. 2A and 2B.

The second interface 14 of the housing 10 comprises a wall 40 which extends perpendicular to the second interface 14 and delimits a draining cavity 42. In the embodiment shown in FIG. 3, the draining cavity 42 is substantially in the shape of a Y. In a variation of the invention, the draining cavity 42 could have a different geometric shape.

Figure 4A:
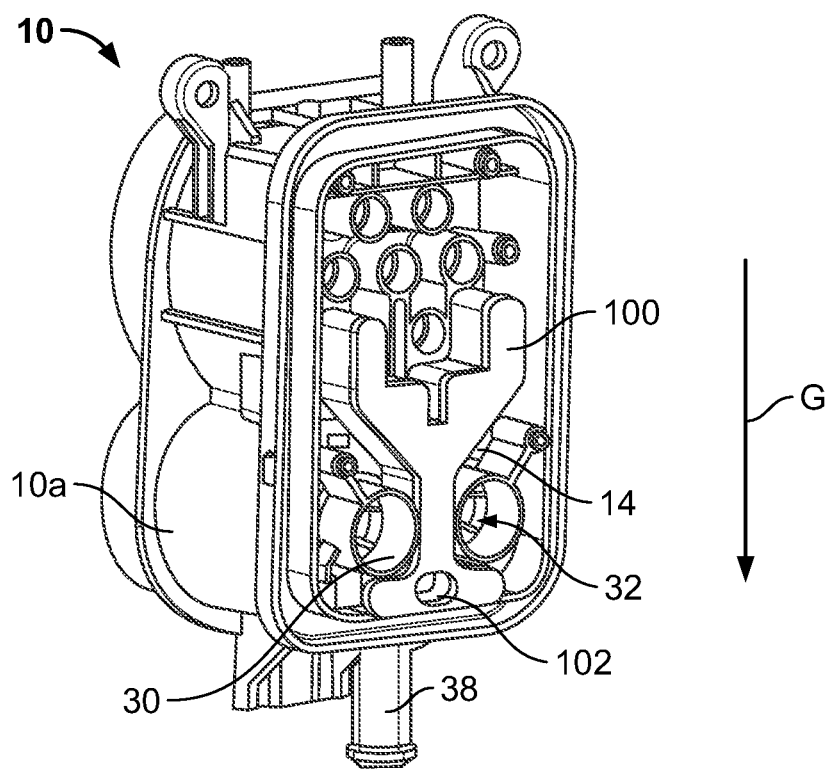
FIG. 4A is a perspective view of a second interface of the housing and the sealing plug.
Figure 4B:
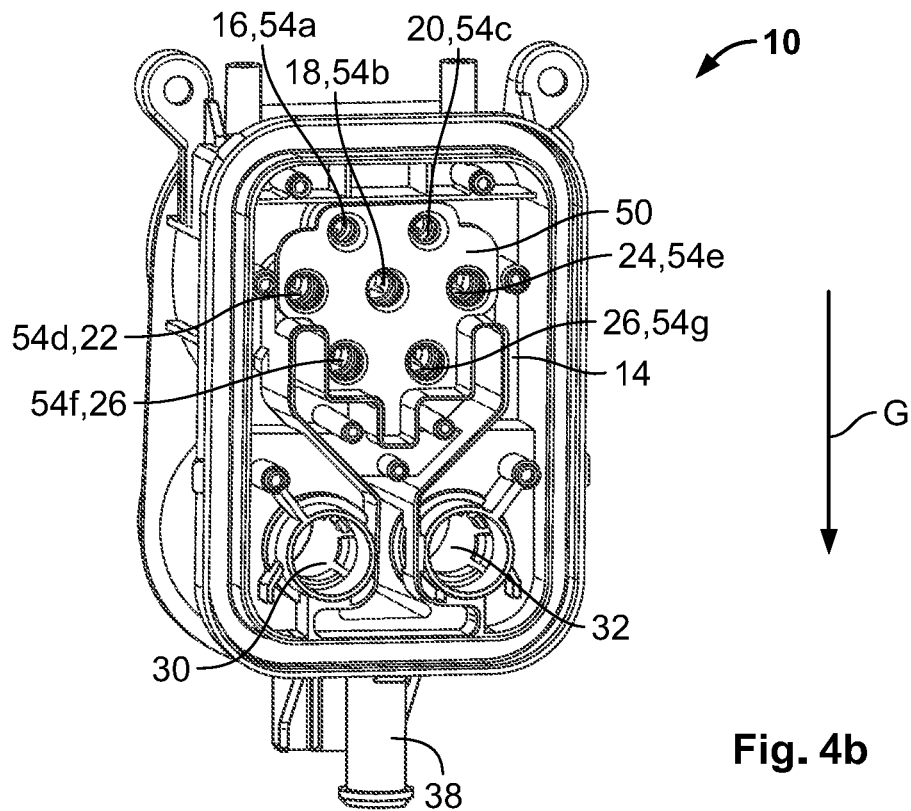
FIG. 4B is a perspective view of the second interface of the housing and the seal.

The orifices 30 and 32 intended to receive the high voltage direct current terminals are disposed either side of draining cavity 42, as shown in FIGS. 3, 4A, and 4B. The draining cavity 42 is in fluid communication with the orifices 22-32 of the second set of orifices E2. Thus, a fluid coming from the orifices 22-32, in particular coming from the drains of the orifices 22-32, can be recovered in the draining cavity 42. A flow path for a fluid coming from the first set of orifices E2 is shown by the outline T2 in FIG. 3.

In a variation, the draining cavity 42 comprises at least two cavities which are independent of each other, disposed in a manner such that a fluid in contact with the high voltage direct current pins in the orifices 30, 32 are fluidically isolated from a fluid in contact with the high voltage alternating current pins in the orifices 22, 24, 26, 28. A draining cavity of this type could therefore comprise a first cavity for recovering a fluid coming from the orifices 30, 32 and a second cavity, isolated from the first cavity, for recovering a fluid coming from the orifices 22, 24, 26, 28.

In another variation, a first cavity could serve for the evacuation of a fluid in contact with a high voltage direct current pin in the orifice 30, a second cavity could serve for the evacuation of a fluid in contact with a high voltage direct current pin in the orifice 32, and a third cavity could serve for the evacuation of a fluid in contact with the high voltage alternating current pins in the orifices 22, 24, 26, 28; the first cavity, the second cavity and the third cavity being configured in a manner such as to be fluidically isolated from each other.

The draining cavity 42 is closed by a sealing plug 100 made from an elastomer, for example, as shown in FIGS. 3 and 4A. FIG. 4A illustrates a view in which the sealing plug 100 is disposed in the draining cavity 42. The dimensions of the sealing plug 100 are such that a fluid coming from the drains of the orifices 22-32 of the second set of orifices E2 can flow in the draining cavity 42 along the second interface 14 in the gravitational direction G. So that a fluid can be evacuated from the draining cavity 42, the sealing plug 100 is provided with an evacuation hole 102 at the lowest point of the sealing plug 100 in the gravitational direction G.

FIG. 3 also illustrates a seal 50 which can be used to constitute the draining chamber 36 (at the level of the first interface 12, visible in FIG. 2B). On one of its interfaces, the seal 50 has a protuberance 52, which is essentially rectangular in the example shown, and with a complementary shape to a cavity 44 at the level of the interface 14 of the housing 10. The seal 50 furthermore comprises a plurality of holes 54a-g with dimensions and dispositions which are a function of the orifices 16, 28, 20, 22, 24, 26, 28 of the housing 10. The holes 54a-g each comprise a wall 56a-g which extends perpendicular to the seal 50 in the same direction as the protuberance 52.

As shown in FIG. 4B, the seal 50 is disposed at the level of the interface 14 of the housing 10, i.e. in a condition in which the seal 50 is assembled with the housing 10. In this assembled condition illustrated in FIG. 4B, the protuberance 52 of the seal 50 has been inserted in the corresponding cavity 44 of the interface 14 of the housing 10. The seal 50 can thus be used to connect the drains (see references 16a, 18a, 20a in FIG. 2B) of the orifices 16, 18, 20 of the first set E1 to the draining chamber 36 located at the level of the interface 12 of the housing 10 in a sealed manner.

As shown in FIGS. 3 and 4A, the housing 10 has a pair of sub-housings 10a, 10b. The first sub-housing 10a corresponds to the housing illustrated in FIGS. 2A and 2B and includes the sets of orifices E1 and E2 as well as the evacuation duct 38. The second sub-housing 10b is designed to be mounted on the second interface 14 of the first sub-housing 10a. The sub-housings 10a, 10b are capable of being assembled by interlocking or by snap fitting. Thus, the housing 10 can be assembled easily and does not require separate components such as screws or nuts for assembly or for mounting.

The second sub-housing 10b has an evacuation duct 202, as shown in FIG. 3. The evacuation duct 202 is tubular in shape in the shown embodiment. In a variation, the evacuation duct 202 could have a different geometry. The evacuation duct 202 is disposed in a manner such that when the housing 10 is in the assembled state, a hollow portion 204 of evacuation duct 202 is brought into communication with the evacuation hole 102 of the sealing plug 100. A fluid can be evacuated from the draining cavity 42 via the hollow portion 204.

In accordance with the present invention, the first evacuation duct 38 is provided in order to evacuate a fluid coming from the first set of orifices E1, while the second evacuation duct 202 is provided in order to evacuate a fluid coming from the second set of orifices E2. The second evacuation duct 202 of the second portion of the housing 200 is disposed in a manner which is substantially perpendicular to the evacuation duct 38. In addition, the second evacuation duct 202 is disposed in a manner such as to evacuate fluid from the second interface 14 in a direction D1 away from the first interface 12. Thus, fluid communication between a fluid coming from the second set of orifices E2—being potentially in contact with the high voltage direct current terminals—and a fluid coming from the first set of orifices E1 is prevented.

As shown in FIG. 5, the second evacuation duct 202 may be provided with an extension 206, further increasing the length L1 of the second evacuation duct 202. Thus, the length L1 of the second evacuation duct 202, optionally increased by the length of the extension 206, is longer than the length of the moisture pathway which could be created on the side of the interface 12 between the orifices 22-32 of the second set E2 and a charging nozzle 300. This disposition can be used to make the path travelled by a fluid coming from the second set of orifices E2 longer than that travelled by a fluid coming from the first set of orifices E1. This disposition can therefore reduce the risk that a leakage current could be created with a fluid coming from the high voltage direct current orifices E1, the leakage current being preferentially generated over the shortest moisture pathway, which would be on the interface 12.

The present invention can therefore be used to separate a fluid coming from the high voltage direct current and alternating current orifices E2 from a fluid coming from the terminals with a lower voltage and from the interface 10, to which a user could connect a charging nozzle 300, as shown in FIG. 5. The housing 10 is disposed with respect to a vehicle 400 provided with bodywork 402 partially illustrated in FIG. 5. The bodywork 402 delineates an internal space 404 from an external space 406 of the vehicle 400.

As shown in FIG. 5, the second evacuation duct 202, 206 is disposed in the internal space 404 of the vehicle 400, thus allowing a fluid to drain in the direction D1 to an internal zone of the vehicle 400 at a distance from the interface 12 and from the charging nozzle 300. The fluid is then evacuated away from the vehicle 400, towards the ground. Thus, the fluid which is at a higher voltage is taken away and evacuated along a path corresponding to the longest path from among the paths which a leakage current could take in order to reach the handle of the charging nozzle 300 which can be handled by the user.

A fluid coming from the orifices 16-18-20-22-24-26-28-30-32 of the housing 10 can therefore be selectively evacuated to either side of an element of the bodywork 402 of a vehicle 400 depending on whether the fluid is coming from the first set of orifices E1 or from the second set of orifices E2. The housing 10 improves electrical safety when charging an electric vehicle, in particular for a charging connector comprising high voltage direct current pins, in particular in conditions where there is heavy rain.

The present invention may be adapted to any of the standards employed for the charging socket which are specific to the geographical region in which the vehicle is being marketed.

The embodiments described are simply possible configurations and it should be borne in mind that the individual characteristics of the various embodiments could be combined together or be provided independently of each other.

What is claimed is:

1. A housing for an electrical connector, comprising:
a first set of orifices receiving a plurality of first pins;
a second set of orifices receiving a plurality of second pins, the second pins having a voltage higher than a voltage of the first pins, the first set of orifices and the second set of orifices extending through the housing from a first interface of the housing toward a second interface of the housing in a connecting direction;
a first draining device evacuating a fluid from the first set of orifices; and
a second draining device evacuating a fluid from the second set of orifices, the first draining device and the second draining device are isolated from each other and prevent fluid communication between the fluid from the first set of orifices and the fluid from the second set of orifices.

2. The housing of claim 1, wherein the first draining device and the second draining device each have an evacuation duct.

3. The housing of claim 2, wherein the evacuation duct of the first draining device is disposed along a direction opposite to the evacuation duct of the second draining device.

4. The housing of claim 3, wherein the evacuation duct of the first draining device extends toward the first interface or toward a bottom of the housing in a gravitational direction.

5. The housing of claim 4, wherein the evacuation duct of the second draining device extends toward the second interface.

6. The housing of claim 5, wherein the evacuation duct of the second draining device extends beyond the second interface.

7. The housing of claim 6, wherein the evacuation duct of the second draining device extends from the second interface in a direction parallel to the connecting direction and opposite to the first interface.

8. The housing of claim 2, wherein the evacuation duct of the first draining device is substantially perpendicular to the evacuation duct of the second draining device.

9. The housing of claim 2, wherein the second draining device has a draining cavity delimited by a wall extending from the second interface.

10. The housing of claim 9, wherein the draining cavity is in fluid communication with the second set of orifices.

11. The housing of claim 10, wherein the draining cavity is closed by a sealing plug, the sealing plug is dimensioned such that the fluid from the second set of orifices is capable of moving between the draining cavity and the sealing plug.

12. The housing of claim 11, wherein the evacuation duct of the second draining device is aligned with a hole in the sealing plug.

13. The housing of claim 12, wherein a fluid from the draining cavity is evacuated toward the evacuation duct of the second draining device.

14. The housing of claim 9, wherein the draining cavity has a Y shape.

15. The housing of claim 2, further comprising a pair of sub-housings that can be interlocked or snap fitted with one another in the connecting direction.

16. The housing of claim 15, wherein a first sub-housing has the first interface and a second sub-housing has the evacuation duct of the second draining device.

17. The housing of claim 1, wherein the electrical connector is part of a charging device for an electric vehicle.

18. The housing of claim 1, wherein the first interface is adapted to be coupled with a housing of a mating electrical connector in the connecting direction.

* * * * *